US012195836B2

(12) United States Patent
Kaplan et al.

(10) Patent No.: US 12,195,836 B2
(45) Date of Patent: Jan. 14, 2025

(54) METHOD FOR HEAT TREATING COMPONENTS

(71) Applicant: RTX Corporation, Farmington, CT (US)

(72) Inventors: Max A. Kaplan, West Hartford, CT (US); Mario P. Bochiechio, Vernon, CT (US); Stephen D. Rittenburg, Midland, GA (US); Paul D. Bennett, Midland, GA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/482,336

(22) Filed: Oct. 6, 2023

(65) Prior Publication Data

US 2024/0110270 A1 Apr. 4, 2024

Related U.S. Application Data

(60) Continuation of application No. 16/818,127, filed on Mar. 13, 2020, now abandoned, which is a division of
(Continued)

(51) Int. Cl.

| | |
|---|---|
| ***F27B 7/06*** | (2006.01) |
| ***C22C 19/03*** | (2006.01) |
| ***C22F 1/00*** | (2006.01) |
| ***C22F 1/02*** | (2006.01) |
| ***C22F 1/10*** | (2006.01) |
| ***F27B 5/06*** | (2006.01) |

(Continued)

(52) U.S. Cl.
CPC ................ *C22F 1/10* (2013.01); *C22C 19/03* (2013.01); *C22F 1/002* (2013.01); *C22F 1/02* (2013.01); *F27B 5/06* (2013.01); *F27D 7/06* (2013.01); *B22F 1/06* (2022.01); *B22F 2003/248* (2013.01); *B22F 5/04* (2013.01); *B22F 2998/10* (2013.01); *B22F 2999/00* (2013.01); *C22C 1/0433* (2013.01)

(58) Field of Classification Search
CPC ... C21D 1/10; C22F 1/002; C22F 1/02; C22F 1/10; F27B 5/06; F27B 7/06
See application file for complete search history.

(56) References Cited

U.S. PATENT DOCUMENTS 5,061,324 A 10/1991 Chang
5,527,403 A 6/1996 Schirra et al.
(Continued)

FOREIGN PATENT DOCUMENTS

EP 0787815 8/1997
EP 2952276 9/2015
(Continued)

OTHER PUBLICATIONS

European Search Report for European Patent Application No. 18180241.4 mailed Oct. 17, 2018.

*Primary Examiner* — Jessee R Roe
(74) *Attorney, Agent, or Firm* — Carlson, Gaskey & Olds, P.C.

(57) ABSTRACT

A method for heat treating a superalloy component includes heating a superalloy component to a first temperature, cooling the superalloy from the first temperature to a second temperature at a first cooling rate in a furnace, and cooling the superalloy component from the second temperature to a final temperature at a second cooling rate. The second cooling rate is higher than the first cooling rate.

8 Claims, 2 Drawing Sheets

Related U.S. Application Data application No. 15/636,511, filed on Jun. 28, 2017, now Pat. No. 10,718,042.

(51) Int. Cl.

| | |
|---|---|
| ***F27D 7/06*** | (2006.01) |
| *B22F 1/06* | (2022.01) |
| *B22F 3/24* | (2006.01) |
| *B22F 5/04* | (2006.01) |
| *C22C 1/04* | (2023.01) |

(56) References Cited

U.S. PATENT DOCUMENTS

| | | | |
|---|---|---|---|
| 5,746,846 | A | 5/1998 | Kim et al. |
| 8,613,810 | B2 | 12/2013 | Mourer et al. |
| 2006/0016527 | A1 | 1/2006 | Yoshioka et al. |
| 2009/0308508 | A1 | 12/2009 | Hong et al. |
| 2009/0320966 | A1 | 12/2009 | Morin |
| 2012/0273093 | A1 | 11/2012 | Hanlon |
| 2013/0344451 | A1 | 12/2013 | Gardin |
| 2017/0088919 | A1 | 3/2017 | Hardy |

FOREIGN PATENT DOCUMENTS

| | | |
|---|---|---|
| WO | 2012047352 | 4/2012 |
| WO | 2016053489 | 4/2016 |

METHOD FOR HEAT TREATING COMPONENTS

CROSS-REFERENCE TO RELATED APPLICATIONS

This application is a continuation of U.S. patent application Ser. No. 16/818,127, filed Mar. 13, 2020; now abandoned, which is a divisional of U.S. patent application Ser. No. 15/536,511 filed Jun. 28, 2017, now U.S. Pat. No. 10,718,042 issued Jul. 21, 2020; the disclosures of which are incorporated by reference in their entirety herein.

BACKGROUND

This disclosure relates to a method of heat treating components, and in particular, components comprising heat treating powder metallurgy processed superalloys.

Powder metallurgy superalloys provide improved damage tolerance, creep resistance, and strength capability to various components, including components for gas turbine engines. The physical characteristics of the superalloy components depend on the microstructure of the components. The microstructure of the components is, in turn, partially dependent on a number of parameters selected during the heat treatment of the components. Heat treatment typically includes one or more stages that require moving the components between various equipment to perform different types of cooling processes. Furthermore, cooling rates of the component during some process steps, such as solution and quenching processes, are difficult to control, thereby leading to microstructural variations.

SUMMARY

A method for heat treating a superalloy component according to an example of the present disclosure includes heating a superalloy component to a first temperature, cooling the superalloy from the first temperature to a second temperature at a first cooling rate in a furnace, and cooling the superalloy component from the second temperature to a final temperature at a second cooling rate. The second cooling rate is higher than the first cooling rate.

In a further embodiment of any of the foregoing embodiments, the first cooling step is performed at a first pressure, and the second cooling step is performed at a second pressure higher than the first pressure.

In a further embodiment of any of the foregoing embodiments, the second pressure is between about 1 and 20 bar (0.1 and 2 MPa).

In a further embodiment of any of the foregoing embodiments, the first temperature is above a solvus temperature for the superalloy component and the second temperature is below the solvus temperature.

In a further embodiment of any of the foregoing embodiments, the furnace includes a fan operable to provide convection within the furnace, and the fan has a first speed during the first cooling step and a second speed during the second cooling step. The second speed is higher than the first speed.

A further embodiment of any of the foregoing embodiments includes performing the second cooling step immediately after the first cooling step without removing the component from the furnace.

In a further embodiment of any of the foregoing embodiments, the superalloy component comprises a supersolvus processed powder metallurgy superalloy. The average grain size is between about 20 to 120 μm (0.787 to 4.72 mils) in diameter.

In a further embodiment of any of the foregoing embodiments, the superalloy component comprises a nickel-based superalloy.

In a further embodiment of any of the foregoing embodiments, the first cooling rate causes formation of a γ' phase of the nickel-based superalloy at grain boundaries.

In a further embodiment of any of the foregoing embodiments, the formation of the γ' phase at grain boundaries causes serration of the grain boundaries.

A method for heat treating a superalloy component according to an example of the present disclosure includes heating a superalloy component to a first temperature, cooling the superalloy from the first temperature to a second temperature at a first pressure in a furnace, and cooling the superalloy component from the second temperature to a final temperature at second pressure. The second pressure is higher than the first pressure, without removing the superalloy component from the furnace.

In a further embodiment of any of the foregoing embodiments, at least one of the first and second pressures are provided by backfilling the furnace with a gas.

In a further embodiment of any of the foregoing embodiments, the second pressure is between 1 and 20 bar (0.1 and 2 MPa).

In a further embodiment of any of the foregoing embodiments, the furnace includes a fan operable to provide convection within the furnace, and the fan has a first speed during the first cooling step and a second speed during the second cooling step. The second speed is higher than the first speed.

In a further embodiment of any of the foregoing embodiments, the first cooling step has a first rate of cooling and the second cooling step has a second rate of cooling. The second rate of cooling is greater than the first rate of cooling.

In a further embodiment of any of the foregoing embodiments, the superalloy component comprises a nickel-based superalloy. The first cooling rate is selected to cause formation of a γ' phase of the nickel-based superalloy at grain boundaries, which causes serration of the grain boundaries.

A system for heat-treating a superalloy component according to an example of the present disclosure includes a furnace operable to cool a superalloy component from a first temperature to a second temperature at a first cooling rate and to cool the superalloy component from the second temperature to a final temperature at a second cooling rate. The second cooling rate is higher than the first cooling rate. The first temperature is above a solvus temperature for the superalloy component and the second temperature is below the solvus temperature.

In a further embodiment of any of the foregoing embodiments, the superalloy component is cooled from the first temperature to the second temperature at a first pressure, and is cooled from the second temperature to the final temperature at a second pressure. The second pressure is higher than the first pressure.

In a further embodiment of any of the foregoing embodiments, the second pressure is between 1 and 20 bar (0.1 and 2 MPa).

In a further embodiment of any of the foregoing embodiments, the furnace includes a fan operable to provide convection within the furnace. The superalloy component is cooled from the first temperature to the second temperature when the fan is operated at a first fan speed, and is cooled from the second temperature to the final temperature when the fan is operated at a second fan speed. The second fan speed is higher than the first fan speed.

DETAILED DESCRIPTION

Figure 1:
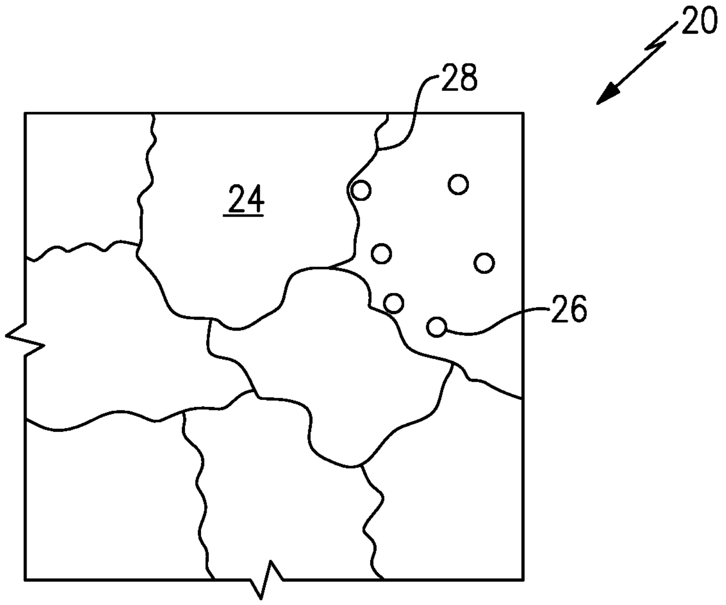
FIG. 1 schematically shows the microstructure of a superalloy component.

FIG. 1 is a schematic view of the microstructure of a superalloy component 20. In one example, the component 20 is a component for a gas turbine engine, such as a cover plate, retaining plate, side plate, heat shield, compressor or turbine rotor or disk, or another gas turbine engine component. However, it will be appreciated that this disclosure is not limited to gas turbine engine components. The superalloy comprises a powder metallurgy superalloy, such as a nickel-based powder metallurgy superalloy. More particularly, the material is a coarse-grain processed powder metallurgy superalloy. Superalloys include crystalline regions, called grains 24. The grains 24 include various solid phases of the superalloy which form the microstructural matrix. In most cases, matrices form precipitates 26 to establish precipitate strengthening mechanisms for capability enhancement. In nickel-base superalloys, one particular phase, known as the γ' (gamma prime) phase, contributes to the strength of the superalloy at elevated temperatures and to its creep resistance. Coarse-grain supersolvus processed powdered metallurgy superalloys typically have average grain sizes between about 20 to 120 μm diameter (0.787 to 4.72 mils). Example coarse-grain superalloys are PRM48, ME16, IN-100, ME501, ME3, LSHR, Alloy 10, RR1000, and NGD2.

The grains 24 are separated by grain boundaries 28. The grain boundaries 28 in FIG. 1 are serrated, but other grain boundaries 28 can be smooth. A higher degree of serration of the grain boundaries 28 yields improved damage tolerance of the component 20. Increasing the amount of precipitates 26 at the grain boundaries 28 increases the degree of serration of the grain boundaries 24.

Figure 2:
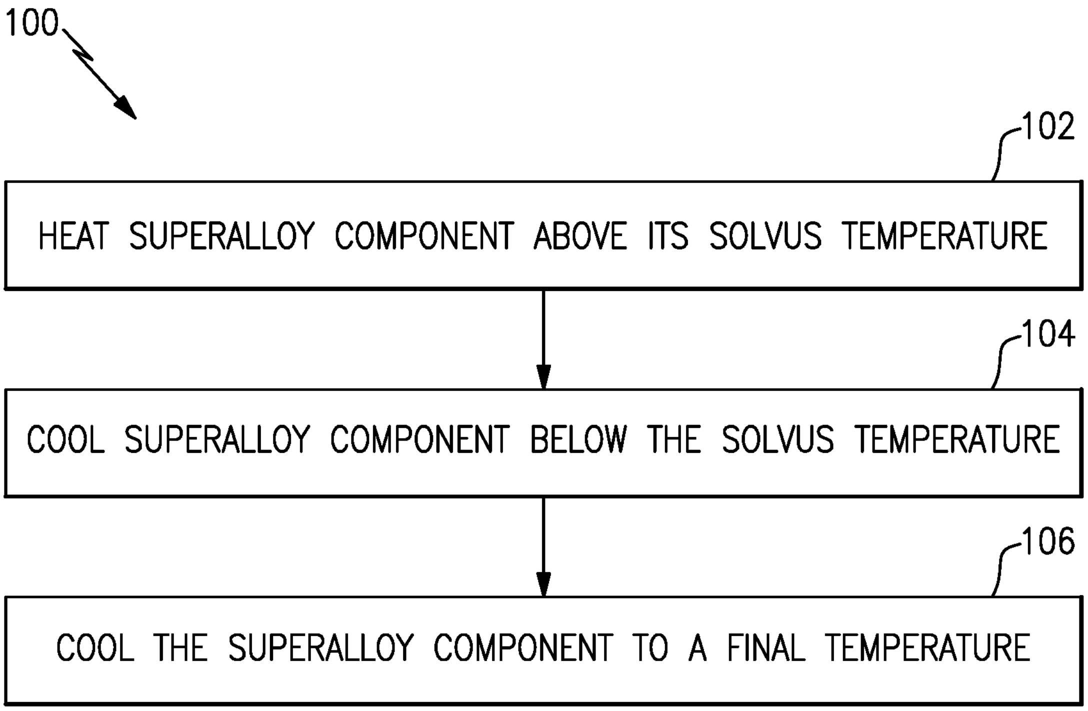
FIG. 2 shows a method of heat treating a superalloy component.
Figure 3:
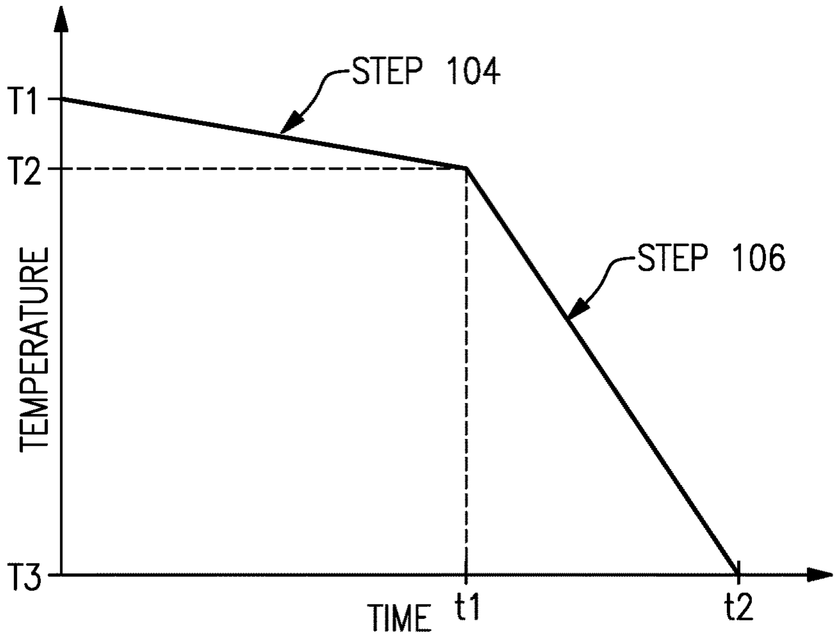
FIG. 3 shows a graph of the temperature of the superalloy component over time.

FIG. 2 shows a method 100 of heat treating a superalloy component. FIG. 3 shows a graph of the temperature of the superalloy over time. In step 102, a superalloy is heated above its solvus temperature T1 using any known ramp and soak method. The solvus temperature T1 depends on the particular composition of the superalloy, but is generally a temperature above which one or more solid microstructural phase 26 either partially or completely dissolves into a parent matrix grain.

In step 104, the component 20 is cooled to a temperature T2 that is below the solvus temperature T1 over a time t1. This first cooling step causes solid precipitates 26, such as precipitates of the γ' phase discussed above, to precipitate into the superalloy matrix. The exact temperature T2 and the time t1 depend on the particular composition of the superalloy and are selected to allow for desired amount of precipitates 26, in particular at grain boundaries 28, which results in serration at grain boundaries 28. This can be observed by metallographic analysis of specimens extracted from fully heat treated components.

Figure 4:
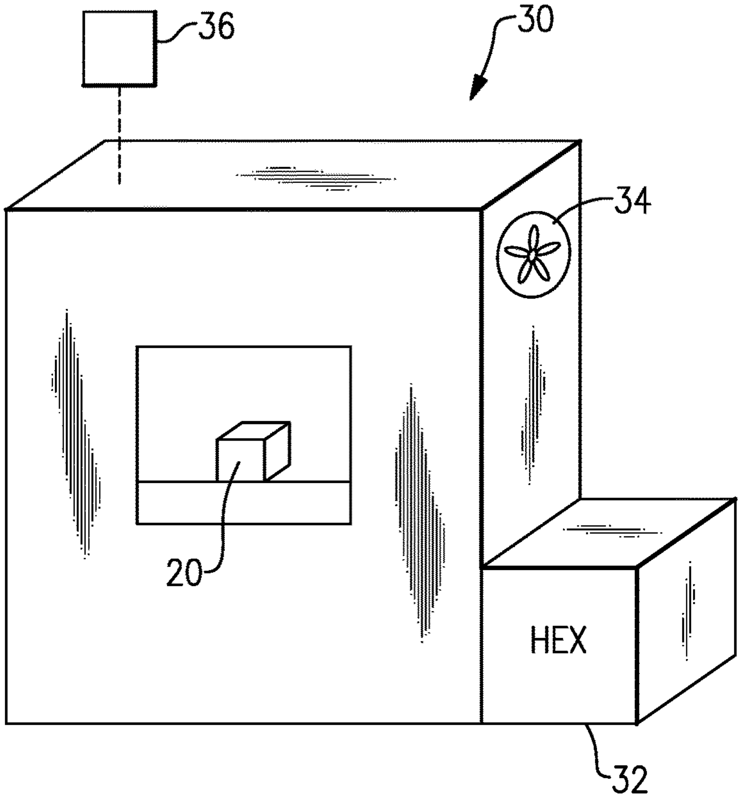
FIG. 4 schematically shows a furnace for heat treating the superalloy component.

Step 104 is performed in a furnace 30, shown in FIG. 4. The furnace 30 includes a high-powered heat exchanger 32 and a high-powered fan 34. The furnace also includes a controller 36 operable to control the temperature of the furnace (i.e., operation of the heat exchanger 32) and the fan 34 speed, as well as pressure in the furnace. The controller 36 includes the necessary hardware and/or software to control the furnace 30 as described herein.

The furnace is held at a first pressure P1 during step 104 by backfilling the furnace 30 with gas, such as helium, argon, or nitrogen, or another inert gas. In one example, the pressure P1 can be atmospheric pressure (approximately 1 bar) or higher. The fan 34 allows for convective cooling within the furnace by circulating the gas. In one example, no convection is provided during step 104. That is, the fan is off. In another example, convection is provided during step 104 by rotating the fan at a fan speed F1.

The furnace 30 allows for control of a cooling rate R1, which is dependent on the temperatures T1 and T2, pressure P1, time t1, fan speed F1, and type of gas. Control of the cooling rate R1 allows for control over the amount of serration of the grain boundaries 28 in the component 20, which in turn affects the physical properties of the superalloy as discussed above. This is in contrast to fluid quench cooling methods, which are difficult to control and can require part-specific insulated cooling, modification of superalloy forging methods, and/or part-specific cooling. Furthermore, the control over the cooling rate R1 allows for greater control of microstructure of components 20 having a wider variety of cross sections and sizes without sacrificing alloy strength. This means smaller parts and near-net forgings can be manufactured without oversizing the parts, reducing manufacturing costs and lead times. Optimal temperature T1, pressure P1, time t1, fan speed F1, and type of gas vary with the composition of the superalloy, as the microstructure formation and growth is compositionally dependent on the kinetics of the alloy system. This is broadly driving towards a target intergranular precipitate size, which will contribute to the severity of grain boundary serration and is also alloy dependent, but intergranular precipitate size may be approximately 500 nm (0.0197 mils) equivalent diameter or greater.

In step 106, the component 20 is cooled from temperature T2 to a final temperature T3 from time t1 to a time t2 by gas quenching. Step 106 allows for further refinement of the microstructure of the component 20. Step 106 is performed in the furnace 30 at a pressure P2 with the fan operating at a fan speed F2. The cooling rate R2 depends on the temperatures T2 and T3, pressure P2, time t2, fan speed F2, and type of gas in the furnace 30. As above, these parameters vary with the specific composition of the superalloy.

Higher pressure and increased convection provided by the fan 34 improve heat transfer between air/gas in the furnace 30 and the component 20, which increases the rate of cooling. Both the pressure P2 and the fan speed F2 during step 106 are higher than the pressure P1 and fan speed F1 during step 104, which provides a cooling rate R2 greater than the cooling rate R1. In one example, the ratio of the cooling rates R1 to R2 is between about 2:1 and 10:1. In a further example, the difference between the pressures P1 and P2 is between about 2 Bar and 10 Bar and the difference between the fan speeds F1 and F2 is between about 10% to 100% of maximum capability of the fan. Higher cooling rates during step 106 improve tensile strength and fatigue properties of the superalloy. As above, pressure P2 is achieved by backfilling the furnace with a gas. The pressure P2 is higher than atmospheric pressure. In a particular example, P2 is between about 1 and 20 bar (0.1 and 2 MPa). In a further example, P2 is between about 10 and 20 bar (1 and 2 MPa).

In one example, steps 104 and 106 are performed in immediate succession without removing the component 20 from the furnace 30. This eliminates variability induced by the need to transfer the component 20 between various pieces of equipment, such as fluid quenching equipment and furnaces. Transferring the component 20 would introduce variability into the cooling process and, in turn, into the microstructure of the component 20. Furthermore, the controller 36 can be programmed to operate the furnace 30 at a particular temperature, pressure, and fan speed for a particular amount of time. This allows for automated control over the temperature, pressure, and convection in the furnace 30 during steps 104 and 106, and automated transition between steps 104 and 106, which reduces process variability.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for heat-treating a superalloy component, comprising:

a furnace operable to cool a superalloy component from a first temperature to a second temperature at a first cooling rate and to cool the superalloy component from the second temperature to a final temperature at a second cooling rate, wherein the second cooling rate is higher than the first cooling rate, and wherein the first temperature is above a solvus temperature for the superalloy component and the second temperature is below the solvus temperature, wherein the furnace includes a heat exchanger, a fan, and a controller configured to control the temperature of the furnace by operation of the heat exchanger, to control the speed of the fan, and to control a pressure in the furnace, wherein the controller is configured to operate the furnace to cool the superalloy component from the first temperature to the second temperature at a first pressure, and cool the superalloy component from the second temperature to the final temperature at a second pressure, wherein the second pressure is higher than the first pressure.

2. The system of claim 1, wherein the second pressure is between 1 and 20 bar (0.1 and 2 MPa).

3. The system of claim 1, wherein the fan is configured to provide convection within the furnace, wherein the superalloy component is cooled from the first temperature to the second temperature when the fan is operated at a first fan speed, and is cooled from the second temperature to the final temperature when the fan is operated at a second fan speed, wherein the second fan speed is higher than the first fan speed.

4. The system of claim 3, wherein the difference between the first pressure and the second pressure is between about 2 Bar and 10 Bar.

5. The system of claim 4, wherein the fan has a maximum capability and the difference between the first fan speed and the second fan speed is between about 10% and 100% of the maximum capability.

6. The system of claim 1, wherein the furnace is held at the first pressure by a gas that is backfilled in the furnace.

7. The system of claim 6, wherein the gas is helium, argon, or nitrogen.

8. The system of claim 1, wherein the ratio between the first cooling rate and the second cooling rate is between about 2:1 and 10:1.

* * * * *